March 12, 1963     J. R. FRISSORA ETAL     3,080,770
SCREW CONTROLLED RELATIVE POSITIONING UNIT
Filed April 18, 1961                      2 Sheets-Sheet 1

*INVENTORS*
JOSEPH R. FRISSORA
JAMES L. KING
BY

ATTORNEYS

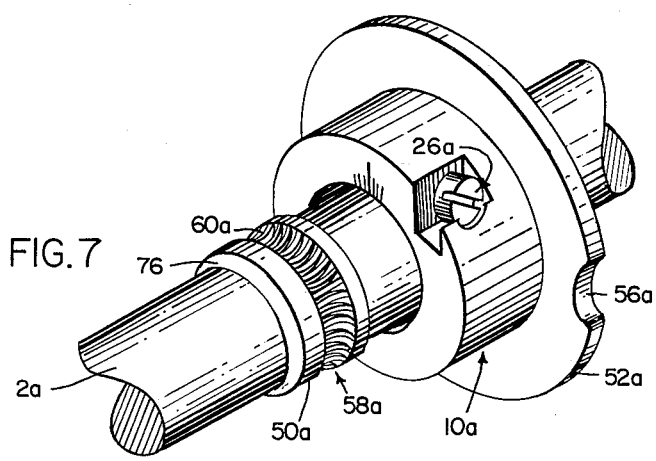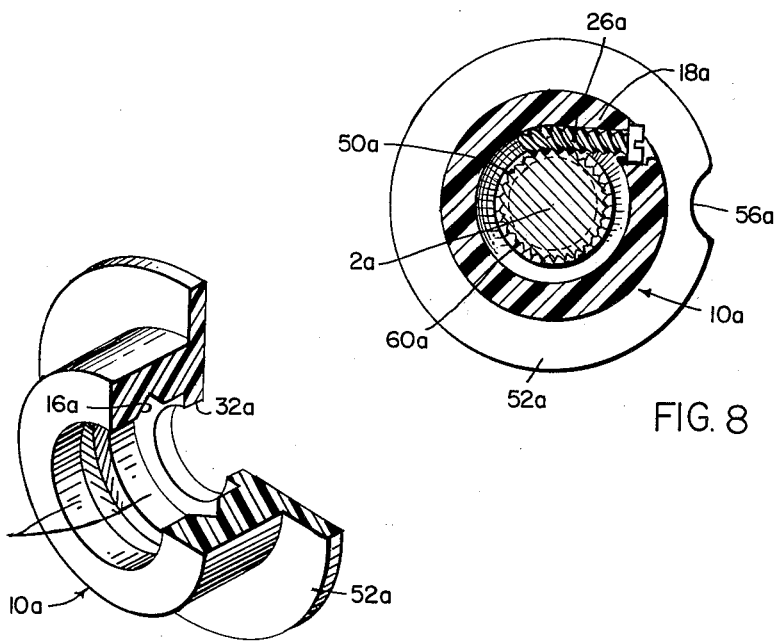

United States Patent Office 3,080,770
Patented Mar. 12, 1963

3,080,770
SCREW CONTROLLED RELATIVE POSITIONING UNIT
Joseph R. Frissora, Harvard, and James L. King, Sudbury, Mass.; said King assignor to Acton Laboratories, Inc., a corporation of Massachusetts
Filed Apr. 18, 1961, Ser. No. 121,795
(Filed under Rule 47(a) and 35 U.S.C. 116)
12 Claims. (Cl. 74—568)

This invention relates to positioning means and more particularly to means for angularly positioning a timing cam or similar element.

Although with conventional units it is a simple manual operation to change the angular position of a timing cam or similar element with respect to a supporting rotatable shaft, precision adjustment of the angular position of a cam, particularly with respect to other cams on the same shaft, is difficult and time consuming. Initial positioning of a cam by visual approximation is rarely satisfactory and subsequent manual adjustment of the cam to attain exactly the desired position is usually a trial and error process which is complicated by the fact that the cam must be held in each new position while means are applied or adjusted to permanently fix the cam in the new position.

The problem can be mitigated by use of a worm device having a worm wheel which is non-rotatably mounted on a rotatable cam shaft, plus a straight worm disposed in a bore in a complementary cam unit rotatably mounted on the same shaft, the worm being disposed in meshing engagement with the worm wheel whereby rotation of the worm will change the angular position of the cam unit relative to the cam shaft. However, there are several difficulties or problems inherent in this solution. First of all, it is necessary that the bore in which the worm is disposed be located precisely so as to cause the worm to be in firm engagement with the teeth of the worm wheel; otherwise there will be back lash between the worm and the worm wheel which will prevent the cam from being locked in a precise position. A second problem consists in locking the worm in a given position after the cam has been turned to a desired position. This is necessary in order to prevent the worm from rotating due to subsequent accidental shock or operational vibration. One way to lock the worm in a given position is to use a set screw. However, this unduly complicates the mechanism. A second way to lock the worm in a given position is to use a cement or potting compound. Unfortunately, this second way also presents difficulties. First of all, a separate material is required to be handled. Secondly, the cement may prevent or complicate subsequent repositioning of the cam.

The present invention contemplates and has as its primary object the provision of a cam positioning unit which is locked against accidental displacement due to operational vibrations and yet may be relocated by application of determined manual effort when desired.

A more specific object of this invention is to provide a worm-controlled relative positioning cam unit utilizing a self-locking resilient worm, whereby additional locking means such as a set screw or cement need not be used to prevent movement of the worm under shock or vibration.

Broadly speaking, the present invention provides a cam positioning unit capable of fine and precise adjustment, said unit comprising a tubular body having a surface defining an interior arcuately-extending groove and a bore communicating with said groove, a cylindrical body with teeth disposed within said tubular body, said teeth being radially opposed to said groove, and a resilient screw, said screw extending through said bore and having a threaded body portion located in said groove in meshing engagement with said teeth, whereby rotation of the screw causes motion of said tubular body relative to said cylindrical body.

More specifically, the object of the present invention is to provide a precision screw-operated relative positioning cam unit which comprises, a tubular body having an interior surface which defines an arcuately-extending groove, a cylindrical body whose exterior surface has circumferentially-extending helical gear teeth, said teeth being radially opposed to said groove, and a resilient screw supported in said tubular body, said screw having a threaded body located in said groove in meshing engagement with said teeth, whereby rotation of the screw causes relative rotation of said tubular and cylindrical bodies, said threaded body of said screw in the absence of said cylindrical body extending into the volume normally occupied by said teeth whereby the presence of said cylindrical body in said tubular body produces a slight deformation of said screw with the latter conforming to the arcuate contour of said groove and said interior surface opposing rotation of said screw.

Other details and many of the attendant advantages of the present invention will become apparent and readily appreciated from a persual of the following detailed description when considered in conjunction with the accompanying drawings in which:

FIG. 7 is a perspective view of a cam shaft and a tubular cam body which together comprise a second form of the present invention;

FIG. 8 is a cross-sectional view of the tubular cam body and shaft of FIG. 7; and FIG. 9 is a perspective view of the tubular cam body of FIG. 7, but with a quarter section removed.

Figure 3:
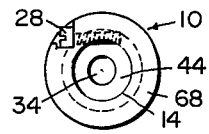
FIG. 3 is an end view of one element of the timing cam assembly.
Figure 1:
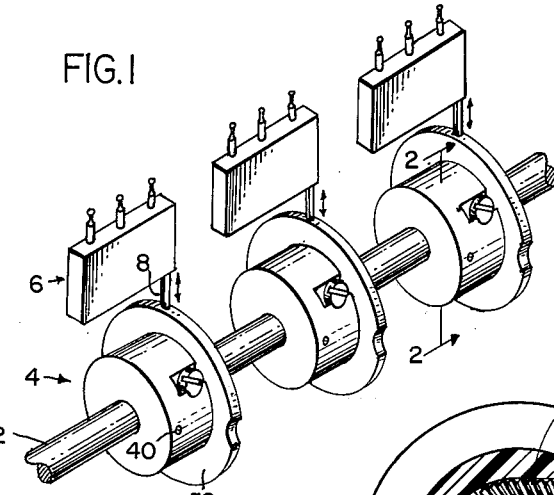
FIG. 1 is a fragmentary perspective view of a timing switch assembly illustrating a preferred use of the present invention.

Referring now to FIG. 1, there is illustrated a conventional constant diameter rotatable cam shaft 2 on which is mounted a plurality of precision screw-adjustable cam assembly units 4 which embody the present invention. These individual cam assembly units 4 are disposed so as to operate a plurality of conventional switches 6 through their spring-biased operating fingers 8. By virtue of the present invention, the cam portion of each cam unit 4 can be set precisely to a specific angular relationship with respect to the cam shaft 2, whereby the various switches 6 can be operated in a predetermined sequence according to the settings of the various cam units. It is to be noted that the means by which the shaft is rotated is irrelevant to the present invention. The cam shaft 2 may be rotated manually or by mechanical or electrical means.

Referring also to FIGS. 2–6, each cam assembly unit 4 comprises a tubular body 10 and a cylindrical body 12. The inner surface 14 of tubular body 10 is formed with an internal circumferentially extending groove 16 which in the instant case is of semicircular cross-section. However, it is to be understood that the cross-section of the internal groove 16 may be varied without departing from the principles of the present invention.

The tubular body 10 is also provided with a lateral bore 18 which communicates with the interior groove 16. The wall of the body member 10 is further provided with an external cavity 20 which communicates with the outer end of bore 18. In forming the external cavity 20, there results a wall 22. This wall 22 is provided with an arcuate slot 24. The purpose of bore 18 is to accommodate a resilient worm or screw element 26 having a head 28 which resides in the cavity 20. The screw 26 is formed of a resilient and compressible material. The wall 22 acts to restrain the head 28 of the screw so as to prevent the latter from moving outwardly. The purpose of the arcuate slot 24 in the wall 22 is to permit the bit of a screwdriver to be inserted into the kerf of the screw head 28, thereby permitting the screw to be turned by the screwdriver while the wall 22 acts against the head of the screw 28 to prevent the screw from coming out of bore 26.

The tubular body 10 is also provided with an inwardly extending flange 32 which defines a circular opening 34 which is sized to snugly accommodate the cam shaft 2. The tubular body 10 is also provided with a radial bore 38 which extends through the flange 32. The bore 38 is threaded to receive a set screw 40 which functions to clamp the tubular body 10 to the cam shaft at any desired position along its axis. It is to be observed that the flange 32 provides an annular wall 44. As pointed out hereafter, wall 44 functions as a shoulder for the cylindrical body 12.

The cylindrical body 12 comprises a wheel portion 50 and a cam portion 52. The wheel portion 50 and the cam portion 52 have a common central opening 54 which is sized to snugly accommodate cam shaft 2.

The wheel portion 50 of the cylindrical body 12 is provided with a peripheral groove generally identified at 58. This peripheral groove 58 is of arcuate cross-section and is provided with a plurality of identical teeth 60 which together form a helical gear.

The cam 52 may be of any desired configuration but has a notch or detent 56 at its periphery. In FIG. 1, each cam 52 is in engagement with a switch operating finger 8. Each finger is held in by its cam 52 and will remain so until the notch 56 has moved into alignment herewith, whereupon the finger will spring outward. Thus, each cam 52 can function to maintain its switch in an "on" state or an "off" state for substantially a full revolution, and then cause the switch to assume the opposite condition when the notch 56 is moved into position to release its operating finger 8.

The cylindrical body 12 is adapted to mate snugly with the tubular body 10, the wheel portion 50 having an outside diameter sized only slightly smaller than the diameter of the inside surface 14 of tubular body 10. The width, i.e., axial length, of wheel portion 50 is sufficient to allow its outside face 64 to lightly contact the shoulder 44 of flange 32 when the face 66 of the cam 52 is in light engagement with the outside face 68 of the tubular body 10. With this arrangement the groove 58 will be in registration with the interior groove 16 of tubular body 10 when the wheel portion 50 is inserted into the tubular body.

Figure 2:
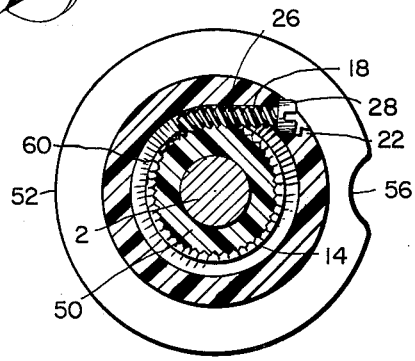
FIG. 2 is a cross-sectional view of a cam shaft and a timing cam assembly embodying the present invention, the view being taken along line 2—2 of FIG. 1.
Figure 4:
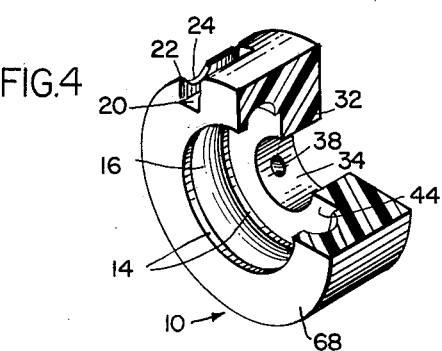
FIG. 4 is a perspective view of the element shown in FIG. 3, but with the element reversed and a quarter section removed.
Figure 6:
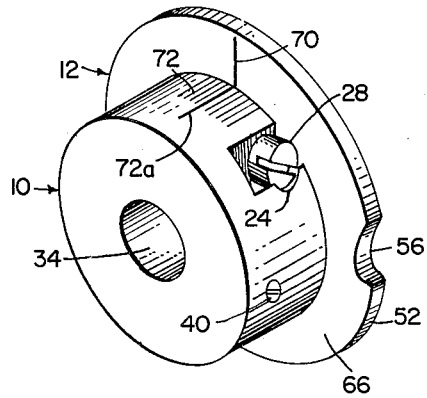
FIG. 6 is a perspective view of a complete timing cam assembly of the type illustrated in FIG. 1.
Figure 5:
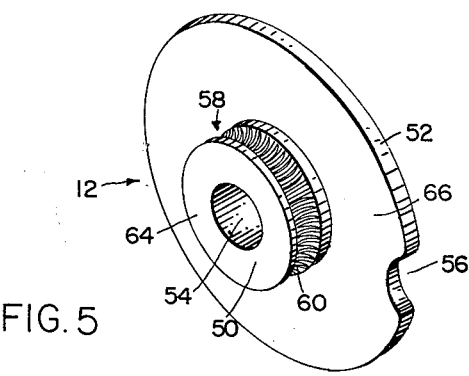
FIG. 5 is a perspective view of a second element of the same timing cam assembly.

At this point it is to be understood that the screw 26 is inserted into the tubular body 10 before the wheel portion 50 of cylindrical body 12. It is to be observed also that the screw 26, when inserted into the bore 18 and also into the groove 16, will occupy some of the space which will be occupied by the wheel portion 50. This situation is deliberate. In the instant construction it is due to the location of bore 18 and the length of screw 26. Bore 18 is drilled so as to be tangent to groove 58 of wheel portion 10. The length of screw 26 is such that with its head 28 disposed in cavity 20, it is too long to be disposed exactly tangent to groove 58. As a consequence, the surface defining the groove 16 acts against the tip of the screw to force it closer to the central axis of the tubular body 10 than the point of tangency of bore 18 and groove 58. Hence when the wheel portion 50 is inserted into the tubular body 10, the screw 26 will partially obstruct the wheel portion 50 and prevent it from moving readily into the tubular body 10. However, since the screw is resilient, it will give when engaged by the wheel 50. The screw will give enough to allow the wheel to be snapped in place. The result is as seen in FIG. 2. The screw is bent at its inner end to conform to the curvature of groove 16. The distortion, i.e., bend, of the screw in FIG. 2 is not large, but it is sufficient for the purpose at hand. If a greater bend is required, the length of the screw may be increased. The screw must extend beyond the point of tangency, but by an amount less than the radius of the base of internal surface 14. As a general rule the length of the screw measured from its tip up to but not including its head should be such that less than half said length should extend beyond the point of tangency of the screw with groove 58. Preferably, the amount of the screw which extends beyond the tangent point should be equal to the screw diameter.

Because the wheel portion 50 causes the screw 26 to be distorted slightly to conform to the curvature of groove 16, the screw will be locked against rotation by the friction between it and groove 16 on the one hand and teeth 60 on the other hand. The screw will always be distorted, regardless of the instantaneous angular relationship between the tubular body 10 and the cylindrical body 12. Nevertheless, the screw still can be turned by a manually operated screwdriver and, as it is turned in one direction, the axial bend in the screw will shift in the opposite direction. The amount of torque required to turn the screw is not excessive as far as manual force is concerned. On the other hand, it is sufficient to prevent the screw from rotating by itself under the influence of shock or operational vibration.

The screw 26 may be made of any suitable resilient and compressible material. Three particularly suitable materials are nylon, vulcanized rubber, and beryllium copper. Other suitable materials will readily suggest themselves to persons skilled in the art.

It is to be observed that the foregoing construction may include a reference line 70 engraved on the face 66 of cam 52 and a series of evenly spaced lines 72 on the outside of tubular body 10. Assuming that lines 72 are spaced by increments of one degree and that one of them, 72a, represents a zero or reference position, the position of line 70 relative to lines 72 will indicate the relative angular position of the cam.

FIGS. 7, 8 and 9 illustrate a second form of the invention. In this case there is provided a tubular body 10a which is substantially the same as tubular body 10 except that (1) its internal groove 16a is of a V-shape instead of semi-circular cross-section, (2) the cam portion 52a is integral therewith, and (3) no provision is made for a set screw like set screw 40 of FIG. 6.

The tubular body 10a is mounted on a cylindrical body 50a which is an integral part of a specially machined cam shaft 2a. Cylindrical body 50a has a groove 58a provided with teeth 60a which are identical to teeth 60. The diameter of shaft 2 is smaller than the smallest corresponding diameter of groove 58a. Hence when the shaft is inserted into tubular body 10a, the screw 26a will not be squeezed tight against groove 16a. However, upon reaching the enlarged cylindrical portion 50a, the screw 26a will be squeezed tight against groove 16a. The screw will yield enough to allow it to be snapped into groove 58a. Once within the groove, the screw will mesh with teeth 60a. Due to the length of the screw and the location of bore 18a, the screw will be slightly distorted and locked tight, in the same manner as in the embodiment of FIGS. 1–6.

It is to be noted that the cylindrical body 50a may be beveled as shown at 76 so as to facilitate snapping the tubular body in place. It is to be noted also that the internal flange 32a fits snugly on shaft 2a and thereby helps prevent the tubular body 10a and cam 52a from wobbling. Further stability is provided by the internal surface 14a which snugly engages the exterior surface of cylindrical body 50a.

While the invention as illustrated and described involves a cam, it is to be understood that the cam may be omitted and replaced by some other element. Thus, for example, the cam may be replaced by a tubular extension or shaft in which case the invention could function as an adjustable coupling between the substitute extension or shaft and the shaft on which the invention is supported.

Obviously many modifications and variations of the present invention are possible in the light of the above teachings. Therefore, it is to be understood that the invention is not limited in its application to the details of construction and arrangement of parts specifically described or illustrated, and that within the scope of the appended claims it may be practised otherwise than as specifically described or illustrated.

What is claimed is:

1. A precision screw-operated positioning unit comprising a screw, a tubular body having a surface defining an arcuate groove and an access bore from the outside communicating with said groove, and a cylindrical body with circumferentially extending teeth; said teeth being radially opposed to said groove; said screw having a head accessible from outside the unit to facilitate rotation of the screw and a resilient threaded body located in said groove in meshing engagement with said teeth, whereby rotation of the screw causes motion of the cylindrical body relative to said tubular body; said threaded body in the absence of said cylindrical body extending into the volume normally occupied by said teeth, whereby the presence of said cylindrical body causes said screw to conform to the arcuate contour of said groove with said surface opposing rotation of said screw.

2. A unit as defined by claim 1 further including means for securing said tubular body to a rotatable shaft, whereby both said cylindrical and tubular bodies will rotate with said shaft.

3. A unit as defined by claim 1 further including a cam which is rotatable on its central axis in response to rotation of said screw.

4. A unit as defined by claim 1 wherein said tubular body has integrally formed means for preventing withdrawal of said screw through said access bore.

5. A unit as defined by claim 1 wherein said cylindrical body is formed integral with a rotatable shaft.

6. A unit as defined by claim 1 wherein said arcuate groove is of curved cross-section.

7. A unit as described by claim 1 wherein said arcuate groove is of V-shaped cross-section.

8. A unit as defined by claim 1 wherein said screw is made of nylon.

9. A unit as defined by claim 1 wherein said screw is made of vulcanized rubber.

10. A unit as defined by claim 1 wherein said screw is made of beryllium copper.

11. A screw-operated adjustable cam unit adapted to be mounted on a shaft comprising a first tubular body member having an interior circumferentially extending groove and means defining a circular opening sized to snugly accommodate a shaft, means for securing said first body member to said shaft, a second cylindrical body member with means defining a cam, said cylindrical body member having a circumferentially extending series of teeth in its exterior surface, said second body member having a circular opening for said shaft, said second body member disposed within said first body member with said teeth in coplanar alignment with said groove, and a screw rotatably mounted in said first body member, one end of said screw disposed within said groove whereby rotation of said screw causes motion of said second body member relative to said first body member.

12. A screw-operated adjustable cam unit as defined by claim 11 wherein said screw is formed of a resilient material and is self-locking.

References Cited in the file of this patent

UNITED STATES PATENTS

| 284,860 | Jones | Sept. 11, 1883 |

FOREIGN PATENTS

| 3,216 | Great Britain | Feb. 14, 1895 |
| 208,875 | Great Britain | Jan. 3, 1924 |
| 583,052 | Great Britain | Dec. 5, 1946 |